March 11, 1958 — J. J. KOWALIK — 2,826,406
SNUBBED SPRING GROUP
Filed May 1, 1952 — 5 Sheets-Sheet 1

INVENTOR.
John J. Kowalik
BY O. B. Garner
Atty.

March 11, 1958 — J. J. KOWALIK — 2,826,406
SNUBBED SPRING GROUP
Filed May 1, 1952 — 5 Sheets-Sheet 2

INVENTOR.
John J. Kowalik
BY O. B. Garner
Atty.

INVENTOR.
John J. Kowalik
BY O.B. Garner
Atty.

INVENTOR.
John J. Kowalik
BY O. B. Garner
Atty.

March 11, 1958 J. J. KOWALIK 2,826,406
SNUBBED SPRING GROUP
Filed May 1, 1952 5 Sheets-Sheet 5

INVENTOR.
John J. Kowalik
BY O. B. Garner
Atty.

United States Patent Office

2,826,406
Patented Mar. 11, 1958

2,826,406

SNUBBED SPRING GROUP

John J. Kowalik, Chicago, Ill., assignor to American Steel Foundries, Chicago, Ill., a corporation of New Jersey Application May 1, 1952, Serial No. 285,363

21 Claims. (Cl. 267—9)

The invention relates to a spring group and more particularly to a novel snubbing device associated therewith.

The general object of the invention is to provide a snubbing device wherein the action of the actuating spring means is operative to maintain the related friction shoe in a fixed position during relative movements of the spring group.

Another general object of the invention is to provide wedge means to vertically wedge an associated friction shoe while said shoe is being urged horizontally into frictional engagement with the related friction surface.

A more specific object of the invention is to provide a friction device for a spring group wherein a longitudinal component of the pressure exerted by the actuating spring means is utilized to engage an auxiliary friction shoe carried by one plate with an auxiliary friction surface carried by the other plate.

Another specific object of the invention is to provide a spring group having a snubbing device wherein multiple friction shoes are operated by a single spring.

Other objects of the invention will become apparent in the course of the following description and by an examination of the concerned drawings, wherein.

Figure 1:
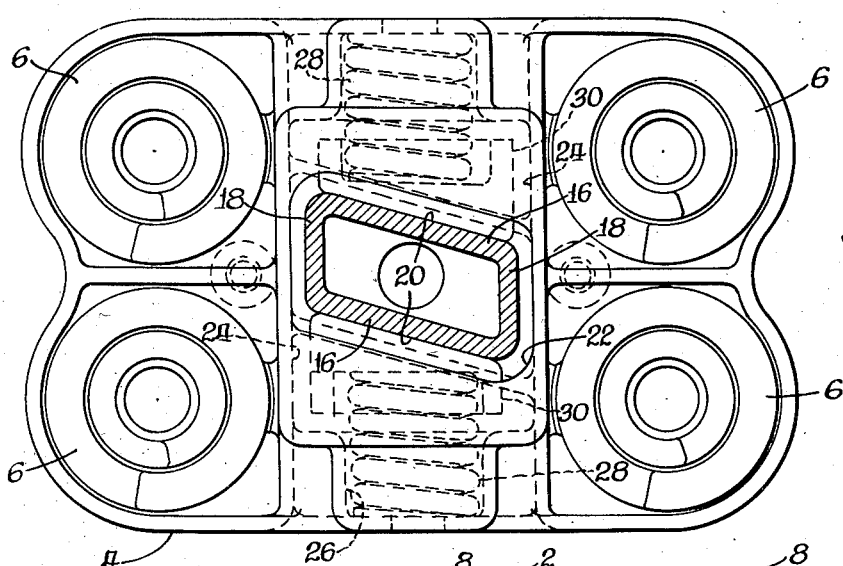
Figure 1 is a plan view of an embodiment of the invention taken along line 1—1 of Figure 2.

To achieve clarity, certain structural details have been omitted from various views, where said details are believed to be adequately shown in other views.

Describing the invention in detail, certain features are common to all of the embodiments herein illustrated, hence corresponding numerals are consistently used to designate these common parts. The spring group consists of a top plate 2 having a depending peripheral flange 3 defining spring seats formed on the lower side of said plate. A bottom plate 4 is positioned in vertical alignment with the plate 2 and has flanges 5 defining spring seats on the side adjacent the top plate 2. Interconnecting the respective plates and seated on the associated spring seats, a plurality of coiled springs 6 are disposed quadrantly of the group. Positioning lugs 8 are formed on the remote faces of the top and bottom plates 2 and 4, their purpose being to offer a method of convenient attachment to a side frame and a bolster (not shown) of a conventional railway car truck, wherein the spring group offers snubbed resilient support for said bolster.

Figure 2:
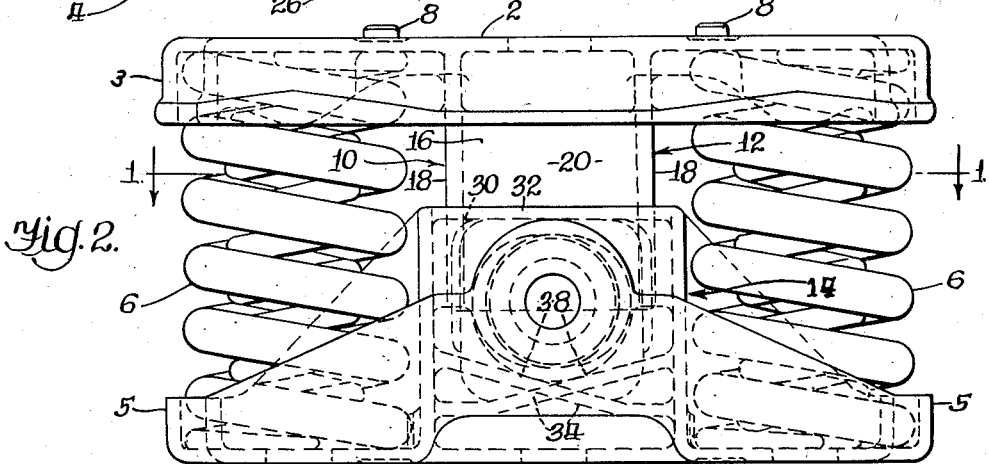
Figure 2 is a side elevational view of the embodiment of Figure 1.
Figure 3:
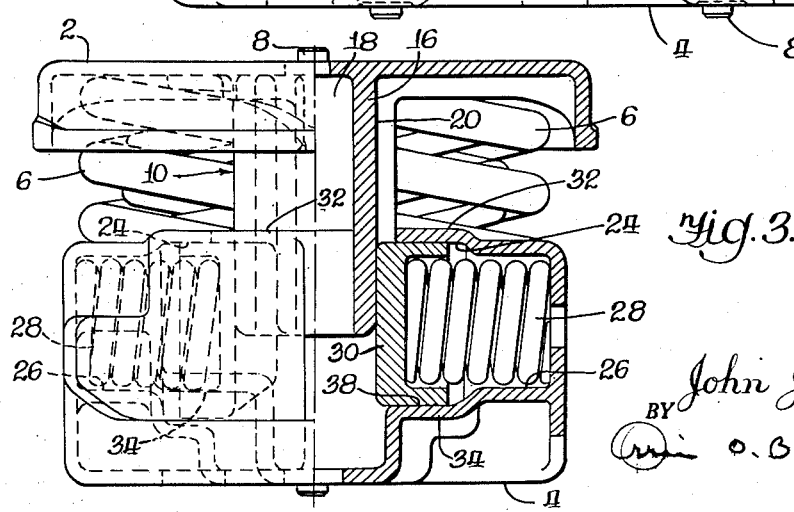
Figure 3 is an end elevational view partly in section of the embodiment of Figure 1.

Referring now to Figures 1 to 3, which illustrate one embodiment of the invention, a friction device generally designated 10 comprises opposed engaging followers 12 and 14 connected to the top and bottom plates 2 and 4, respectively. The follower 12 consists of depending substantially longitudinal walls 16, 16 interconnected by the transverse walls 18, 18. The longitudinal walls 16 present on opposed sides thereof, the outwardly facing parallel friction surfaces 20, 20 which are arranged obliquely to the vertical center planes of said group.

The top follower 12, as noted, depends from the top plate 2 and in the assembled condition is disposed to be received by the recess 22 defined by the bottom follower 14 centrally of the plate 4. On opposed sides of the recess 22, the bottom follower 14 is formed to present pockets 24, 24 having adjacent openings communicating with the recess 22. Outboardly of each pocket 24, the follower 14 necks down to form a partially closed tubular or cylindrical portion 26 which receives and seats the related end of the coil spring 28, which in turn operatively engages the associated friction shoe 30 disposed within the pocket 24. The springs 28, 28 being in a compressed condition, are operative to exert a pressure against the related shoes 30 along a horizontal line which is common with the longitudinal axis of the spring and in oblique relation to the friction surfaces 20.

It is well to note that each pocket 24 has its vertical limits defined by the horizontal wall or abutment 32 and the inclined wedge wall 34. The wedge wall 34 and the abutment 32 are disposed to embrace the related friction shoe 30 and to engage same along complementary faces or sides thereof.

Due to the fact that the friction surfaces 20 converge in opposed directions with the longitudinal vertical center plane of the group, the spring means urge the related shoes into engagement with the friction surfaces and therealong in opposed directions. The wedge walls 34 and the associated shoe engaging wedge surfaces 38 are formed to angle upwardly in the direction of the longitudinal movement of the related shoe. Thus it is seen that the spring means cooperate with the related friction surface to urge said shoe to move along said surface and into engagement with the wedge surface and abutments carried by the follower which carries the friction shoe. This wedging action maintains the shoes in a substantially constant vertical plane during relative movement of the group and thereby prevents oscillation of the shoe during relative vertical movement of the plates.

Figure 4:
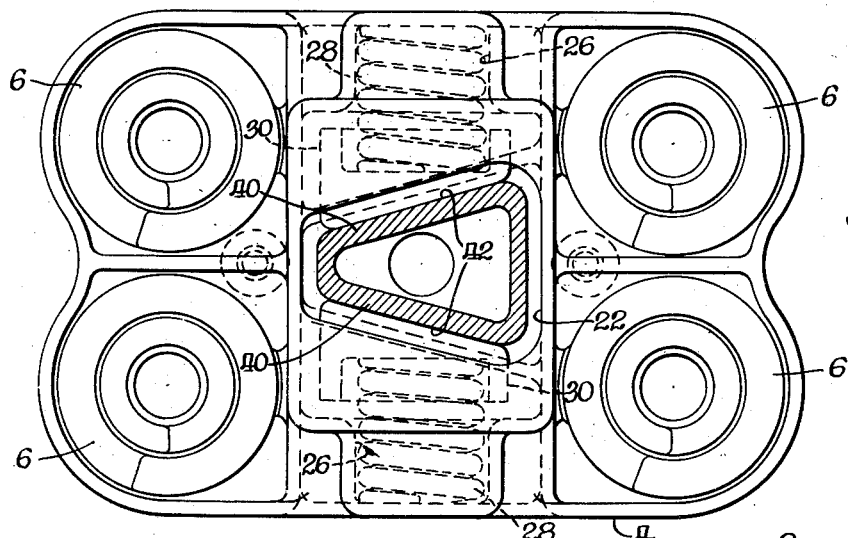
Figure 4 is a sectional plan view of another embodiment of the invention taken along line 4—4 of Figure 5.
Figure 5:
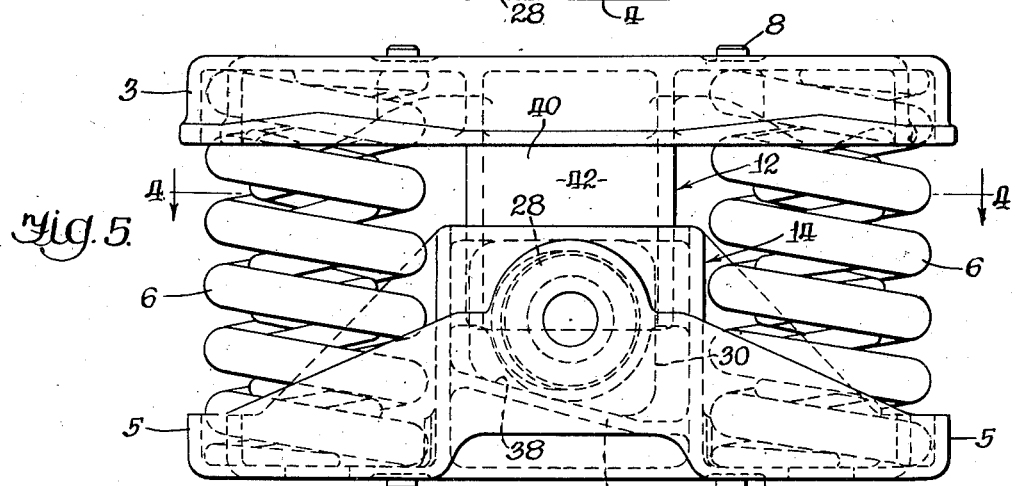
Figure 5 is a side elevational view of the embodiment of Figure 4.
Figure 6:
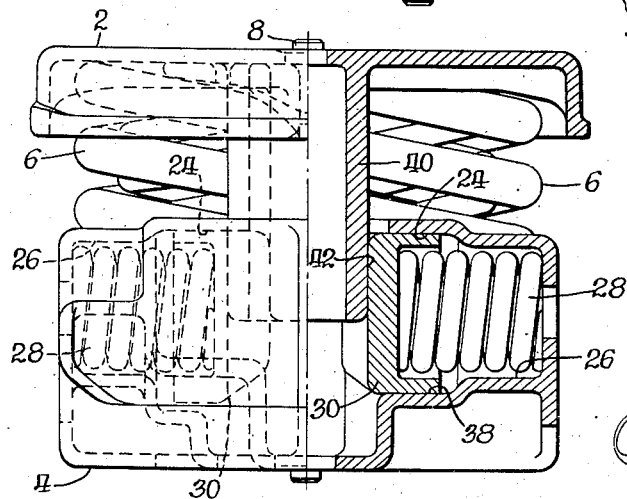
Figure 6 is an end elevational view partly in section of the embodiment of Figure 4.

The embodiment of Figures 4 to 6 is similar in construction and operation to that of Figures 1 to 3, except that the longitudinal walls 40 depending from the upper plate 2 are arranged to converge with each other as well as to individually converge with the longitudinal vertical center plane of the group. The friction shoes 30, 30, under the action of the springs will move along the friction surfaces 42, 42 in the same direction, hence to accomplish the requisite wedging action, the wedge walls 34 of the pockets 24 are disposed to incline upwardly in the same direction, that is, the longitudinal direction of the shoe movement along friction surface 42. This construction is best seen in Figure 5.

Figure 7:
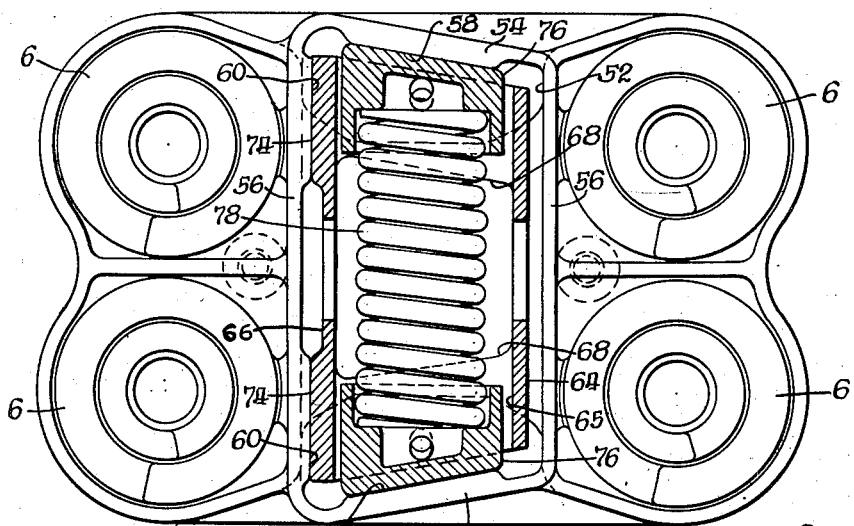
Figure 7 is a plan view taken along line 7—7 of Figure 8 of another embodiment of the invention.
Figure 8:
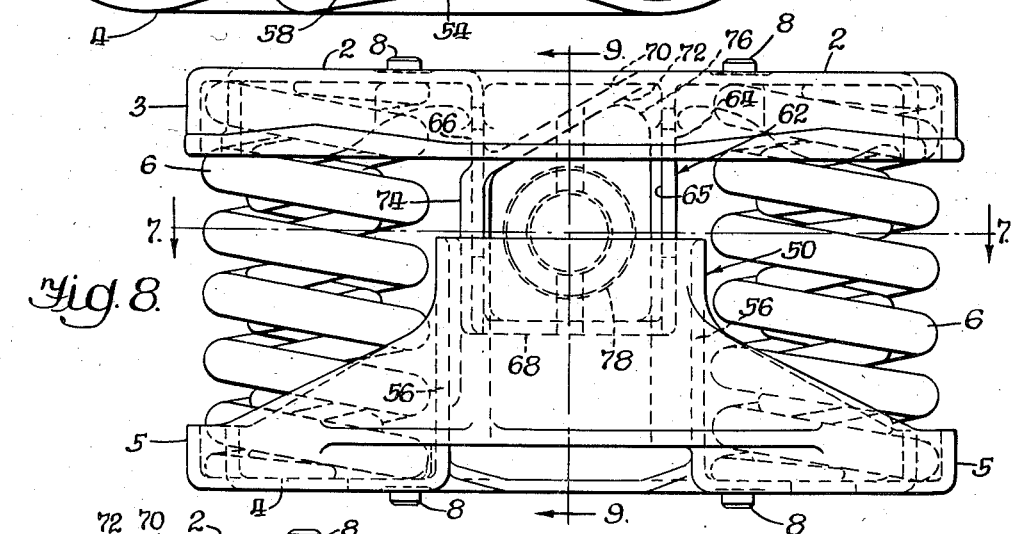
Figure 8 is a front elevational view of the embodiment of Figure 7.
Figure 9:
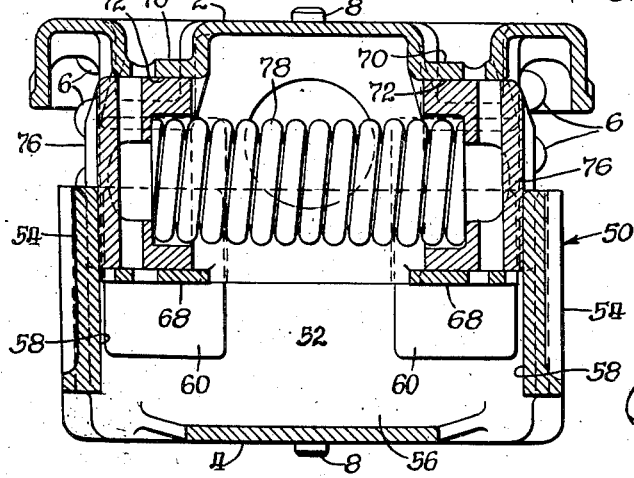
Figure 9 is a sectional side elevational view taken along line 9—9 of Figure 8.

Figures 7, 8 and 9 illustrate another embodiment of the invention wherein the lower follower 50 presents the box-like pocket 52 defined by spaced interconnected longitudinally and transversely disposed walls 54 and 56, respectively. The pocket, as best seen in Figure 7, is of trapezoidal form in horizontal cross section. The pocket 52 is characterized by the fact that the parallel walls 56, 56 thereof are disposed normal to the central vertical longitudinal plane of the group, and the non-parallel walls 54, 54 converge with each other and with the mentioned plane. Friction surfaces 58, 58 are presented by the inboard faces of the non-parallel walls 54, 54. Other friction surfaces 60, 60 are formed on the inboard face of one of the parallel walls 56.

The upper follower 62 depends from the upper plate 2 and is received by the pocket 52 of the lower plate 4. Said follower 62 comprises the transversely disposed walls 64 and 66 having integral connection at their upper ends with the top plate 2 and being interconnected at their lower remote ends by the horizontally disposed walls or abutments 68, 68. The walls 68, 68, the top plate 2, and the transverse walls 64 and 66, define an open end passageway 65, of rectangular form in transverse section, and disposed to extend transversely of the group and, in the assembled condition, present opposed openings at points adjacent the friction surfaces 58, 58 of the non-parallel walls 54, 54 of the lower follower 50.

Above each abutment 68 a wedge wall 70 is formed integral with the top plate 2 and one side wall 66. Each wedge wall slopes downwardly in the direction of divergence of the related non-parallel longitudinally extended walls 54, 54 and presents on its lower side a correspondingly sloped wedge surface 72. The transverse wall 66 presents on its outboard face the friction surfaces 74, 74 and, in the assembled condition, said surfaces operatively engage the other friction surfaces 60, 60 of the lower follower 50. Friction shoes 76, 76 are movably carried by the upper plate 2 adjacent the respective open ends of the passageway 65 and intermediate the related abutments 66 and the wedge wall 70. Spring means 78, the preferred form of which is the coiled spring of the illustration, is carried by the upper plate and disposed horizontally within the passageway 65 and having opposite ends thereof engaging the associated friction shoes 76, 76. Pressure is exerted by the spring means 78 along a horizontal line which, when extended to the friction surfaces 58, 58 is in oblique relation therewith. This construction enables the spring means 78 to urge the friction shoes 76, 76 outwardly and into engagement with the related surfaces 58, 58 and therealong in a diverging direction until each shoe is in wedged engagement with the embracing abutment 66 and wedge surface 72 of the wedge wall 70. Due to the action between the friction shoes 76, 76 and the related surfaces 58, 58, a longitudinally directed component of the pressure of the spring means 78 is available to urge the top follower 62 into frictional engagement with the friction surfaces 60, 60 along the complementary surfaces 74, 74.

Figure 10:
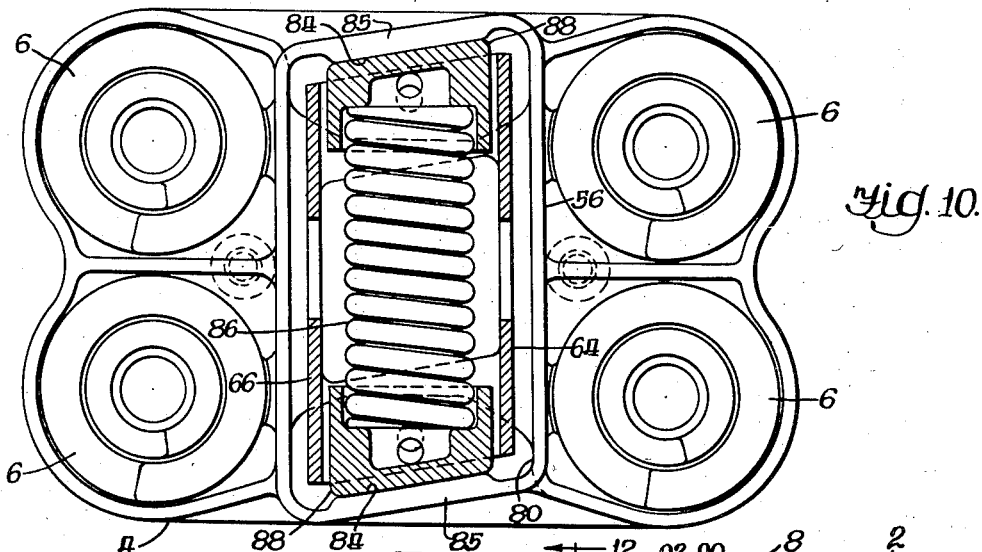
Figure 10 is a plan view, taken along line 10—10 of Figure 11, of an alternate embodiment of the invention.
Figure 11:
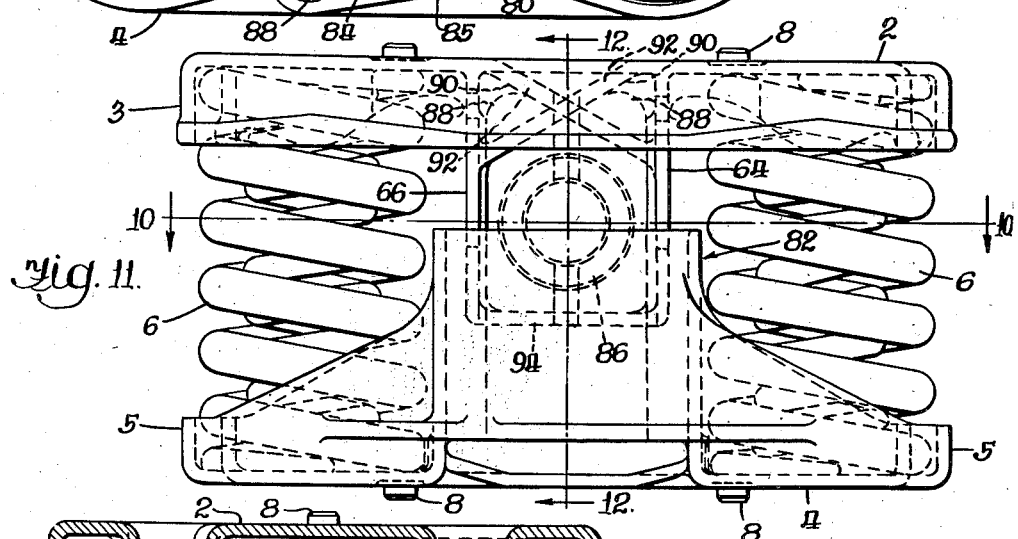
Figure 11 is a side elevational view of the embodiment of Figure 10.
Figure 12:
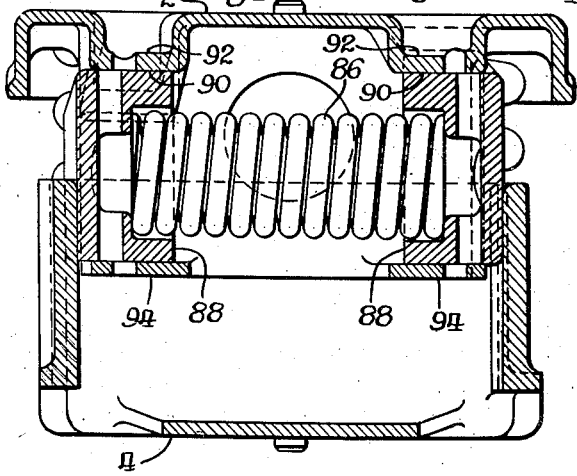
Figure 12 is a sectional end elevational view taken along line 12—12 of Figure 11.

The embodiment shown in Figures 10 to 12, in operation and construction, is substantially similar to that shown and described relative to the embodiment of Figures 7 through 9, except that the box-like pocket 80 of the lower follower 82 is of parallelogram form in horizontal cross section, hence the friction surfaces 84, 84 of the longitudinal walls 85, 85 converge in opposed directions with the central vertical longitudinal plane of the spring group. The pressure line of the spring means 86 is still obliquely related to the friction surfaces 84, 84 of the lower follower, but the related friction shoes 88, 88 are urged to move along the associated surfaces in opposed directions, hence the wedge surfaces 90, 90 of the wedge walls 92, 92 are required to angle downwardly in opposed directions, as best seen in Figure 11. However, the action of the spring means 86 is still operative to engage each shoe 88 with the related friction surface 84 and therealong to wedge the shoe firmly between the associated wedge wall 92 and abutment 94. It is also to be noted that the longitudinal component of the spring pressure available at one shoe is opposed to that available at the other shoe, thus eliminating the possibility of utilizing that force to maintain direct frictional contact between the upper and lower followers as accomplished in the embodiment of Figures 7 to 9.

Figure 13:
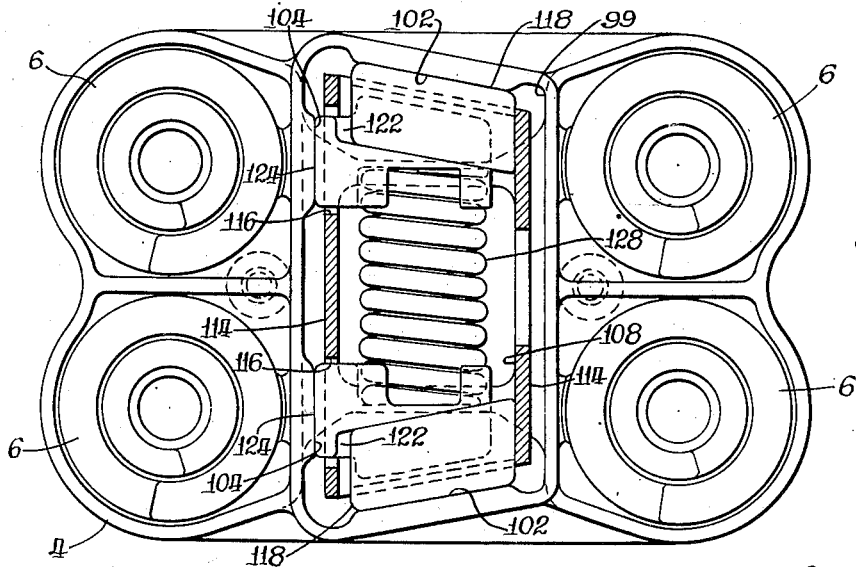
Figure 13 is a plan view of another embodiment of the invention taken along line 13—13 of Figure 14.
Figure 14:
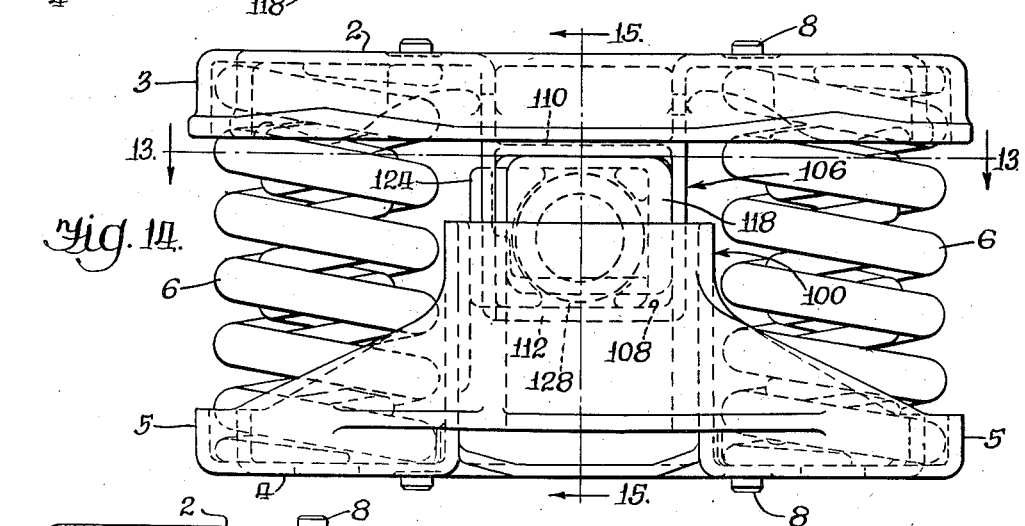
Figure 14 is a side elevational view of the embodiment of Figure 13.
Figure 15:
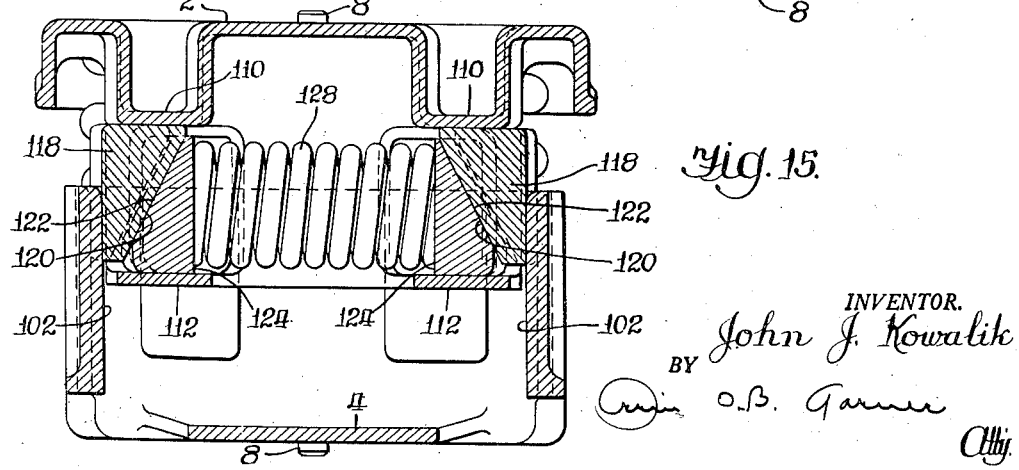
Figure 15 is a sectional end elevational view taken along line 15—15 of Figure 14.

In the embodiment of Figures 13 to 15, the lower follower 100 again defines a pocket 99 of trapezoidal form in horizontal cross section. Opposed converging friction surfaces 102, 102 are presented on the non-parallel walls of said pocket and other friction surfaces 104, 104 are formed to face inboardly from one of the parallel walls of said pocket.

The upper follower 106, which may be formed integrally with the top plate 2, depends therefrom to be received by the pocket 99 of the lower plate 4. Passageway 108 is presented by the upper follower 106 and is disposed to extend transversely of the plate 2 and form openings at opposed ends adjacent the friction surfaces 102, 102 of the lower follower. As seen in the end view of the passageway 108, the vertical limits thereof are defined by the horizontally disposed abutments or walls 110, 110 and 112, 112, which may be formed integral with the side walls 114, 114. The upper follower 106 also presents vertical slots or openings 116, 116 in one side wall 114 at points adjacent the friction surfaces 104, 104.

Movably carried by the upper follower at respective ends of the passageway 108, the friction shoes 118, 118 are disposed in complementary engagement with the related friction surfaces 102, 102. Inboardly of each shoe, a surface 120 is formed thereon, and in the assembled condition, is in inclined or converging relation to the associated friction surface 102. Each surface 120 is preferably in complementary planed engagement with a similarly disposed wedge surface 122 formed on the outboard face of an auxiliary friction shoe 124. It is to be noted that the wedge surface 122 of shoe 124 is in inclined relation with both coordinate vertical center planes of the spring group, and as best seen in Figure 15, the wedge surface 122 in combination with the abutment 112 embraces the associated outboard friction shoe 118.

Spring means 128, preferably of the illustrated coil spring type, may be disposed within the passageway 108 to engage the respective ends thereof, the auxiliary friction shoe 124 and to exert a horizontal pressure thereagainst along a line which, if extended, bears an oblique relation to the friction surfaces 104, 104.

In operation, the pressure of the spring means 128 is operative to urge the friction shoes 118, 118 outwardly and into engagement with the friction surfaces 104, 104 and concurrently upwardly, along and between said friction surfaces 104, 104 and the wedge surfaces 122, 122 and into wedged engagement with the related abutment walls 110, 110. Due to the inclined relation between the line of pressure of the spring means and the wedge surfaces 122, 122 of the auxiliary shoes 124, 124, a longitudinally directed force component of the spring pressure is operative to urge the auxiliary friction shoes through the slots 116, 116 and into frictional engagement with the associated friction surfaces 104, 104, and abutments 112, 112.

It is to be noted that in the various embodiments illustrated in Figures 1 through 15, the friction surfaces are carried by one plate of the group and the friction shoes, spring means, and wedge surfaces are carried by the other plate of the group.

I claim:

1. In a spring group having spaced top and bottom plates with a plurality of coiled springs therebetween, the combination of a snubbing device comprising flat vertical friction surfaces carried by one of said plates, each surface being angularly related to a central vertical longitudinal plane passing through the group, friction shoes carried by the other of said plates in complementary engagement with said surfaces, wedge means engaging said friction shoes and comprising one surface parallel to and integral with said other plate and another surface carried by said other plate and in inclined relation thereto, and at least one spring operatively engaging said friction shoes along a compressional axis angularly related to said friction surfaces and urging the shoes to engage the other surface and said friction surfaces and move vertically into engagement with said one surface.

2. In a spring group having spaced top and bottom plates with a plurality of springs therebetween, the combination of a snubbing device comprising at least one vertical friction surface carried by one of said plates, at least one friction shoe carried by the other of said plates and engageable with said friction surface, wedge means engaging said friction shoe and comprising one surface parallel to and integral with said other plate and another surface carried by said other plate and in inclined relation thereto, and spring means operatively engaging said shoe and urging same to engage the other surface and said friction surface and move vertically into engagement with said one surface.

3. In a spring group, according to claim 2, wherein said spring means comprises a spring carried by said other plate and in pressured engagement with said shoe.

4. In a spring group having relatively movable vertically spaced top and bottom plates with a plurality of springs therebetween, the combination of a snubbing device disposed intermediate said plates, said device on one plate comprising a plurality of flat vertical friction surfaces in oblique relation to the coordinate vertical center planes of the group, and on the other plate comprising friction shoes disposed on opposite sides of said group and having flat faces to engage said friction surfaces, pressure means including spring means interposed between and operatively engaging the shoes for biasing the latter outwardly into engagement with said friction surfaces, said pressure means extending transversely of the spring group between said plates, and wedge surfaces carried by said other plate engaging each shoe, the combination being formed and arranged so that the friction surfaces, the spring means, and the wedge surfaces cooperate to maintain the friction faces in substantially vertical planes during relative movement of said plates, and to tend to move the friction shoes in horizontal direction.

5. A spring group comprising spaced plates with intermediate springs and a friction shoe carried by one plate engaging a friction surface carried by the other plate, the combination of spring actuating means engaging the shoe and urging same along a horizontal line into engagement with said surface, said surface lying in a vertical plane and being arranged obliquely to the mentioned line and to a vertical longitudinal plane through the group, the spring means being operative to urge said shoe horizontally along said surface, and wedge means comprising a pair of angularly interrelated surfaces carried by said one plate and disposed to engage said shoe and fixedly restrict horizontal movement of said shoe along said surface.

6. In a spring group having spaced plates with springs quadrantly disposed therebetween and having a friction device connected to both plates operative to choke relative movements of the plates toward and from each other, the combination of flat vertical friction surfaces in oblique relation to the coordinate vertical center planes of the device comprising a portion of said device on one plate, friction shoes comprising a portion of said device on the other plate arranged to engage said surfaces, pressure means operatively engaging said shoes and disposed to exert a pressure thereagainst along a compressional axis obliquely disposed relative to the friction surfaces and substantially parallel to said plates, and means cooperating with the pressure means to fixedly position said shoes on said other plate during relative movement between said plates, said means comprising at least one wedge surface engaging each shoe and in angular relation with the plane of said other plate, said pressure means tending to move the friction shoes relative to the friction surfaces in planes parallel with said plates.

7. In a friction snubbing device, spaced plates resiliently movable toward and away from each other, a friction device intermediate said plates and comprising opposed followers connected to the respective plates, one follower consisting of walls integral with and normal to the connected plate and presenting flat vertical friction surfaces disposed approximately longitudinally of the group and in oblique relation to the vertical center planes of the group, the other follower comprising movable friction shoes slidably supported at points adjacent the friction surfaces, wedge surfaces provided on said other follower adjacent the friction shoes and arranged for biasing the friction shoes in direction transverse to the direction of movement of the plates toward and from each other, and spring means interposed between and urging said shoes transversely of the group and into engagement with said friction surfaces.

8. In a spring group, vertically spaced top and bottom plates, a plurality of load carrying springs engaged between said plates, one of said plates having flat vertical friction surfaces disposed on opposite sides of and angularly related to the central vertical longitudinal plane of the group, the other of said plates having integral thereon angularly related wedge surfaces and abutment surfaces adjacent their respective friction surfaces and defining therewith pockets, friction shoes in said pockets in complementary engagement with their respective friction, abutment and wedge surfaces, said abutment surfaces being parallel to said other plate, and resilient means yieldably resisting movement of said shoes away from their respective friction, abutment and wedge surfaces, and wedge surfaces being arranged for biasing the friction shoes in direction transverse to the direction of movement of the plates toward and from each other.

9. In a spring group having spaced top and bottom plates with a plurality of springs therebetween, the combination of a snubbing device comprising friction surfaces perpendicularly upstanding from one of said plates and extending substantially longitudinally of the group and in oblique relation to the longitudinal vertical center plane of the group, friction shoes carried by the other of said plates and in complementary engagement with said friction surfaces, wedge means on said other plate engaging said friction shoes and comprising one surface parallel to and integral with said other plate and another surface carried by said other plate and in inclined relation thereto, and spring means operatively engaging said shoes and urging the same to engage the other surface and said friction surfaces and move vertically into engagement with said one surface, said spring means including at least one compressed spring operative along a compressional axis to yieldably resist disengagement of said shoes from said surfaces on said top and bottom plates 10. A friction device according to claim 9, wherein the friction surfaces are parallel to each other and located centrally of the group, and the spring means comprises springs disposed horizontally in housings on opposite sides of said friction surfaces, each spring engaging a shoe and operative to urge same inwardly of the group.

11. A friction device according to claim 10, wherein said wedge means comprises vertically spaced abutments formed on each housing, one of said abutments being parallel to the horizontal and the other being in obtuse angle relationship thereto.

12. A friction device according to claim 9, wherein the friction surfaces are in converging relation to each other and are located centrally of the group, and the spring means comprises springs disposed horizontally in housings on opposite sides of the surfaces, each spring engaging a shoe and operative to urge same inwardly of the group.

13. A friction device according to claim 12, wherein said wedge means comprises vertically spaced abutments formed on each housing, one of said abutments being parallel to the horizontal and the other being in acute angled relationship thereto, the horizontal abutments lying in a common plane and the acute angled abutments lying in a common plane.

14. A friction device according to claim 9, wherein the friction surfaces are in converging relation and are located on opposite sides of the group, and the spring means comprises a single spring interposed between the shoes and urging same outwardly of the group.

15. A friction device according to claim 14, wherein said wedge means comprises abutments on said other plate, some of which are parallel to the plate and others of which are in acute angle relation to the plate.

16. A friction device according to claim 9, wherein the friction surfaces are parallel to each other and located on opposite sides of the group, and the spring means comprises a single spring interposed between the shoes and urging same outwardly of the group.

17. A friction device according to claim 16, wherein said wedge means comprises abutments on said other plate some of which are parallel to the plate and others of which are in acute angle relationship to the plate, the parallel abutments lying in a common plane and the acute abutments lying in intersecting planes.

18. In a spring group, spaced plates and resilient means interposed therebetween, a friction device therebetween comprising a housing on one plate formed of walls normally upstanding therefrom, friction surfaces directed inwardly on the walls at opposite ends of the housing, said surfaces being in converging relation to each other, auxiliary friction surfaces on another wall of said housing, a follower on the other plate received within the housing, friction shoes carried by the follower at opposite ends thereof, said shoes being engageable with the first mentioned friction surfaces, wedge shoes engaging the friction shoes and engageable with the auxiliary friction surfaces, and compressed spring means interposed between the wedge shoes.

19. In a spring group, spaced plates and resilient means interposed therebetween, a friction device therebetween comprising a housing on one plate formed of side and end walls normally upstanding therefrom, friction surfaces extending vertically and facing inwardly on end walls of the housing, said surfaces being in converging relation to each other from one side wall toward the other side wall, a follower on the other plate received within the housing, friction shoes carried by the follower at opposite ends thereof and engageable with the friction surfaces, wedge shoes engaging the friction shoes along flat surfaces, said flat surfaces converging on both the longitudinal and transverse vertical center planes of the group, and spring means interposed between the wedge shoes for biasing them outwardly into wedging engagement with the friction shoes.

20. A spring group according to claim 19, including abutments on the follower engaging said friction shoes, and abutments on said one plate engaging the wedge shoes.

21. In a spring group having spaced top and bottom plates with a plurality of springs therebetween, the combination of a snubbing device comprising vertical friction surfaces carried by one of said plates in oblique relation to the coordinate vertical center planes of the device, friction shoes carried by the other of said plates, wedge means on the friction shoe carrying plate comprising one surface parallel to and integral with the friction shoe carrying plate and another surface in inclined relation thereto, said surfaces embracing said friction shoes, and spring means carried by the shoe carrying plate having its compressional axis in oblique relation to the friction surfaces and operatively engaging said friction shoes and being operative to urge said shoes into engagement with the friction surfaces.

References Cited in the file of this patent

UNITED STATES PATENTS

| | | |
|---|---|---|
| 1,809,908 | Olander | June 16, 1931 |
| 2,356,742 | Bachman | Aug. 29, 1944 |
| 2,356,743 | Light | Aug. 29, 1944 |
| 2,357,264 | Light | Aug. 29, 1944 |
| 2,370,107 | Light et al. | Feb. 20, 1945 |
| 2,483,181 | Clasen | Sept. 27, 1949 |
| 2,483,375 | Tack | Sept. 27, 1949 |
| 2,516,072 | Piron | July 18, 1950 |
| 2,528,473 | Kowalik | Oct. 31, 1950 |
| 2,561,308 | Cottrell | July 17, 1951 |
| 2,627,402 | Smith | Feb. 3, 1953 |
| 2,687,295 | Tucker | Aug. 24, 1954 |